United States Patent [19]
Aydt et al.

[11] Patent Number: 5,738,402
[45] Date of Patent: Apr. 14, 1998

[54] FOLDING TOP FOR VEHICLES

[75] Inventors: Matthias Aydt, Eberdingen; Kurt Pfertner, Wimsheim; Jan Just, Leonberg; Christof Blech, Renningen; Dominik Beierl, Korntal-Münchingen, all of Germany

[73] Assignee: Dr. Ing. h.c.F. Porsche AG, Weissach, Germany

[21] Appl. No.: 802,417

[22] Filed: Feb. 18, 1997

Related U.S. Application Data

[63] Continuation of Ser. No. 561,968, Nov. 22, 1995, abandoned.

[30] Foreign Application Priority Data

Nov. 23, 1994 [DE] Germany ............... 44 41 669.5

[51] Int. Cl.[6] .................................................. B60J 7/12
[52] U.S. Cl. .................................... 296/118; 296/107
[58] Field of Search ............................. 296/107, 118, 296/121, 100; 160/399, 402, 403

[56] References Cited

U.S. PATENT DOCUMENTS

| | | |
|---|---|---|
| 1,298,836 | 4/1919 | Vetter. |
| 2,686,691 | 8/1954 | Burrell ........................ 296/107 |
| 2,798,763 | 7/1957 | Dujic ........................... 296/107 |
| 3,090,646 | 5/1963 | Johnson ....................... 296/107 |
| 3,486,788 | 12/1969 | Benton ......................... 296/120 |
| 4,275,099 | 6/1981 | Dani .............................. 428/31 |
| 5,013,083 | 5/1991 | Yada et al. .................. 296/213 |
| 5,033,787 | 7/1991 | Takada ......................... 296/102 |
| 5,269,582 | 12/1993 | Muller et al. ................ 296/135 |

FOREIGN PATENT DOCUMENTS

| | | |
|---|---|---|
| 421492C1 | 4/1993 | Germany. |
| WO 93/21030 | 10/1993 | WIPO ................... B60J 7/08 |

OTHER PUBLICATIONS

Germany Office Action, Jun. 9, 1995, Germany.
European Search Report, Feb. 7, 1996, Europe.

*Primary Examiner*—Joseph D. Pape
*Attorney, Agent, or Firm*—Evenson, McKeown, Edwards & Lenahan, P.L.L.C.

[57] ABSTRACT

A folding top for vehicles includes a folding top structure and a folding top covering, an edge area of the folding top covering being fastened on a rear-side tensioning bow of the folding top structure and a sealing body being held in position which is in an operative connection with an adjoining vehicle body part. In order to achieve a simple mounting of the folding top covering and of the sealing body on the tensioning bow during the first assembly and in the case of repair, it is provided that separate receiving devices for fastening the folding top covering and for holding the sealing body are arranged on the tensioning bow.

20 Claims, 4 Drawing Sheets

FOLDING TOP FOR VEHICLES

This application is a continuation of application Ser. No. 08/561,968, filed on Nov. 22, 1995 now abandoned.

BACKGROUND AND SUMMARY OF THE INVENTION

This invention relates to a folding top for vehicles having a folding top structure and a folding top covering, an edge area of the folding top covering being fastened on a rear-side tensioning bow of the folding top structure, and a sealing body being mounted on the tensioning bow and being in an operative connection with an adjoining vehicle body part.

From German Patent Document DE 42 10 492 C1, a folding top for vehicles is known in the case of which an edge area of the folding top covering extends around the rear edge of a multi-part tensioning bow and is held in position on its underside by means of a holding rail. A sealing body is inserted into the holding rail and is in an operative connection with the adjoining body part.

It is an object of the invention to fix the edge area of the folding top covering and a sealing body interacting with the adjoining vehicle body part on the tensioning bow in such a manner that, during the first assembly and in the case of a repair, a simple mounting of the folding top covering and of the sealing body is achieved on the tensioning bow.

According to the invention, this object is achieved wherein separate receiving devices for fastening the edge area of the folding top covering and for holding the sealing body are provided on the tensioning bow.

Principal advantages achieved by means of the invention are the fact that, as a result of the separate receiving devices on the tensioning bow, the mounting and the demounting of the folding top covering is significantly simplified in the case of the first assembly and of a repair. The second sealing body, which is received between the two receiving devices in an additional receiving device, compensates locally occurring gap areas of different sizes between the folding top covering and the folding top compartment lid.

The second sealing body prevents an abrasion on the folding top fabric in the case of a relative movement of the folding top compartment lid and the tensioning bow. Furthermore, the second sealing body further optimizes the sealing in the area of the tensioning bow when the folding top is closed.

Other objects, advantages and novel features of the present invention will become apparent from the following detailed description of the invention when considered in conjunction with the accompanying drawings.

DETAILED DESCRIPTION OF THE DRAWINGS

Figure 1:
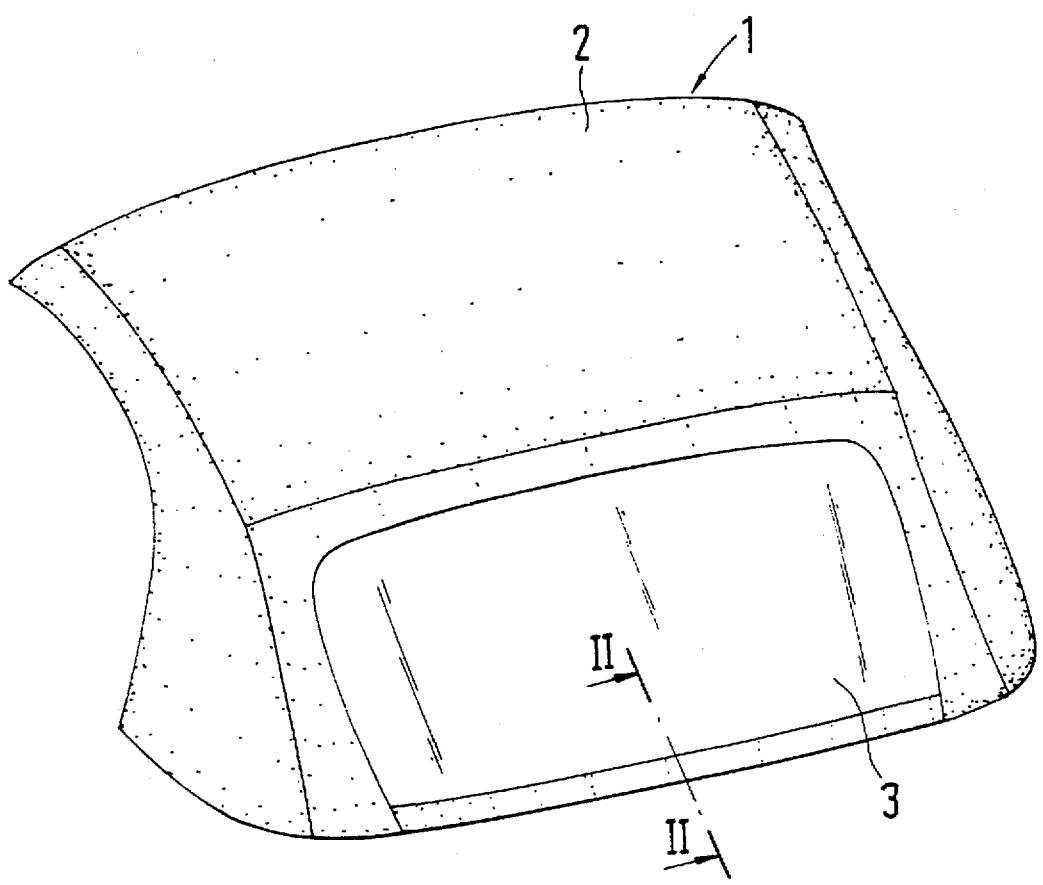
FIG. 1 is a perspective view from the rear of a folding top of a vehicle of the type contemplated by the present invention.

A folding top 1 comprises a supporting folding top structure, which is not shown in detail, and an elastic folding top covering fastened thereto. In the rearward, transversely extending area of the folding top 1, a rear window 3 is provided which is formed by a rigid or flexible viewing pane.

In a tightly tensioned position (FIG. 2), the folding top covering 2 is fastened below the rear window 3 on a tensioning bow 4 which is formed at least in sections by a bent extruded profile made of a light metal alloy.

The tensioning bow 4, which viewed from above, has an approximately U-shaped overall course, forms the lower end of the folding top 2 and, in a manner not shown in detail, is rotatably linked on its two forward ends with an adjoining main hoop of the folding top structure. In the rearward, transversely extending area, the tensioning bow 4 is locally fixed by way of two spaced holding straps 5 on the adjoining vehicle body.

Figure 2:
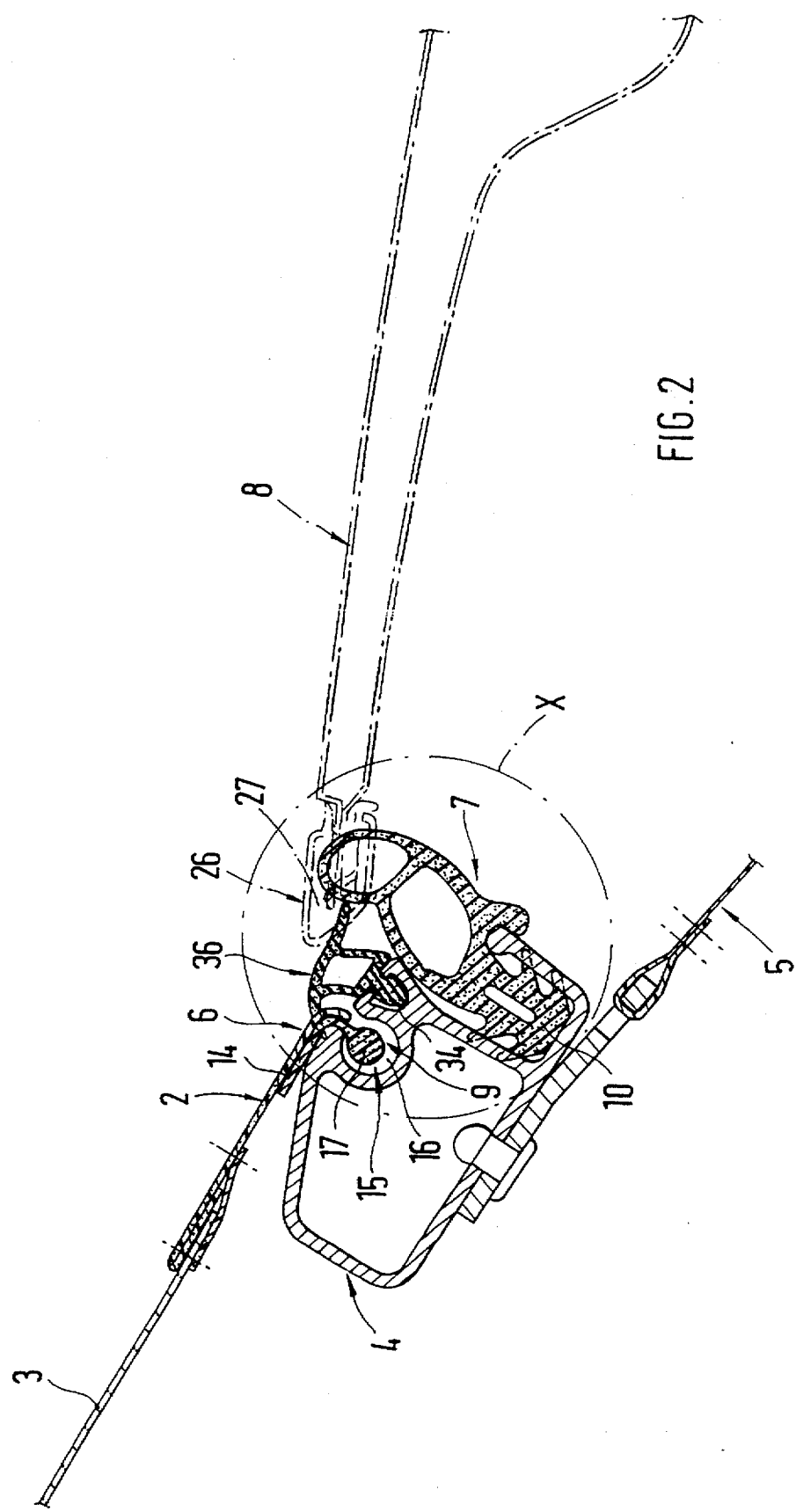
FIG. 2 is an enlarged sectional view taken along Line II—II of FIG. 1 and showing a preferred embodiment of the present invention.

According to FIG. 2, an edge area 6 of the folding top covering 2 is fastened to the rear-side tensioning bow 4. A sealing body 7 is also held in position on the tensioning bow 4 and is in an operative connection with an adjoining vehicle body part. In the embodiment shown, the vehicle body part is formed by a folding top compartment lid 8.

According to the invention, at least two separate, spaced receiving devices 9, 10 for fixing the rearward edge area 6 of the folding top covering 2 and for holding the sealing body 7 are provided on the tensioning bow 4.

Figure 3:
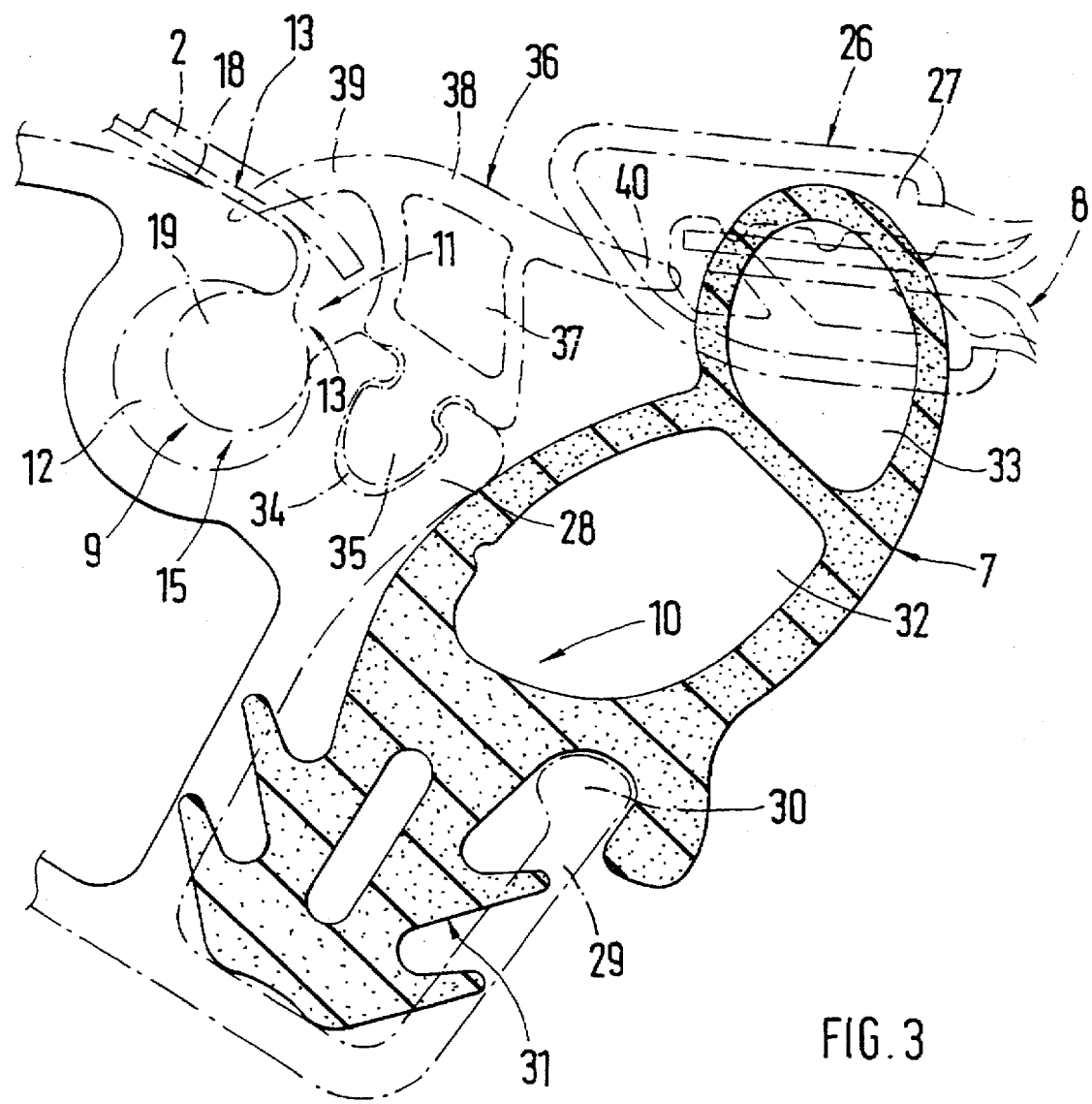
FIG. 3 is an enlarged detail "X" of FIG. 2.

The first receiving device 9 for the folding top covering 2 is formed by an undercut longitudinal groove 12 which is provided with a narrow insertion opening 11 and into which an edge-side holding section 13 of the folding top covering 2 is inserted (FIG. 3).

According to FIGS. 2 and 3, the longitudinal groove has an approximately circular cross-section. The insertion opening 11 is provided on the top side of the tensioning bow 4.

The holding section 13 is formed by a retaining strip 14 which is fastened on the interior side of the folding top covering 2 and which has, in the area of the longitudinal groove 12 at least one holding element 15 which interacts with the longitudinal groove 12 in a form-locking manner.

In FIG. 2, the holding element 15 is formed by an eye-type area 16 in which the insert 17 is placed.

According to FIG. 3, the holding section 13 is formed by a weatherstrip 18 which is sewn on the interior side to the folding top covering 2 and which, in the area of the longitudinal groove 12, has a cross-sectional widening 19 constructed in one piece with the weatherstrip 18.

The approximately circular cross-sectional widening 19 has a smaller cross-section than the circular longitudinal groove 12.

Figure 4:
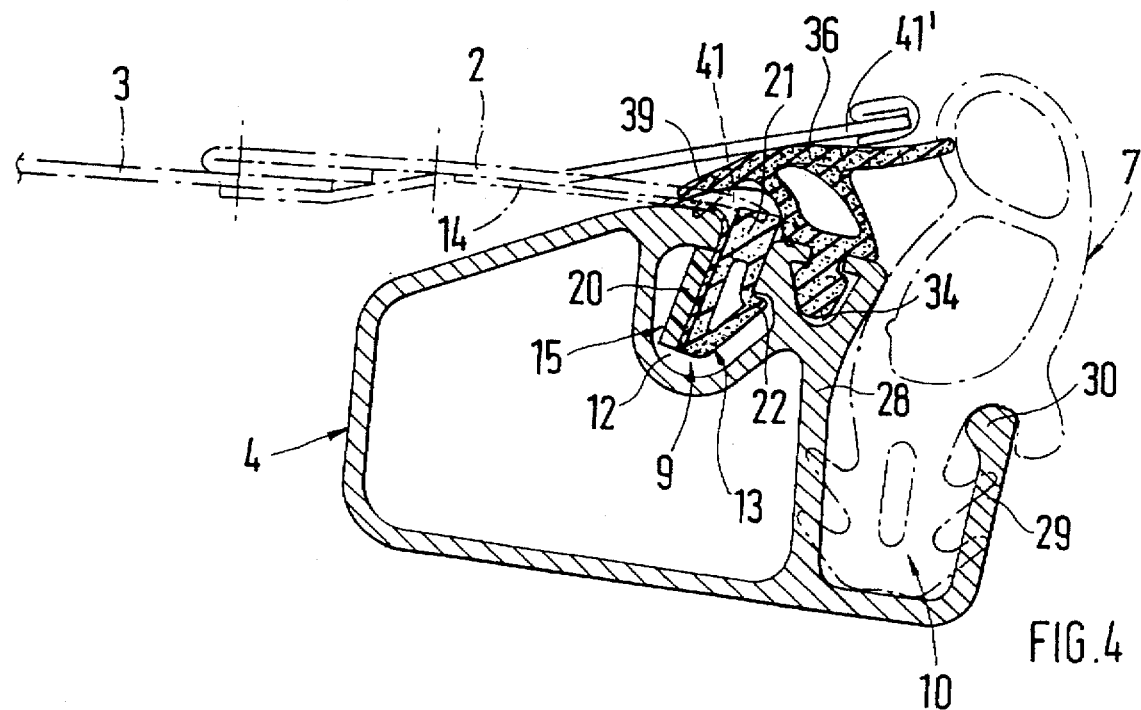
FIG. 4 is a sectional view corresponding to FIG. 2 and showing a further preferred embodiment of the invention.
Figure 5:
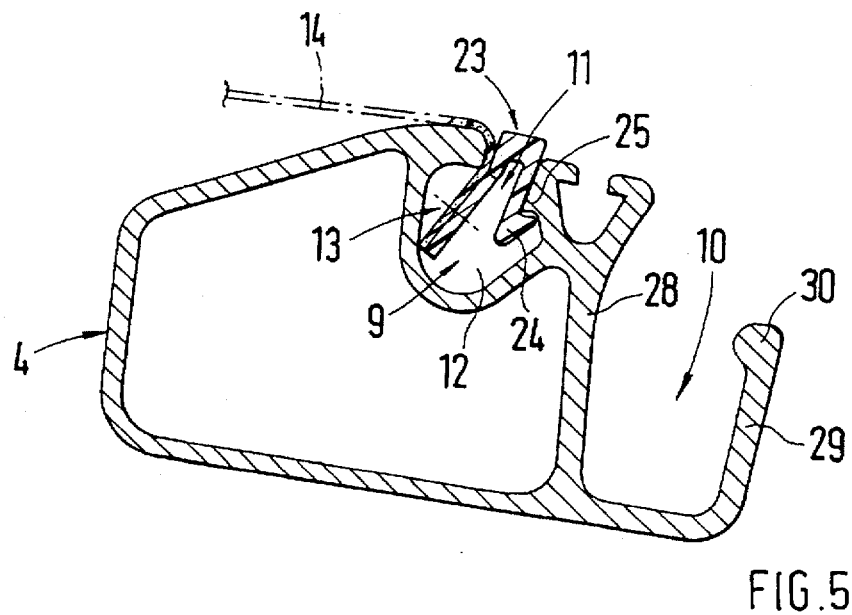
FIG. 5 is a sectional view corresponding to FIG. 2 showing a third embodiment of the invention.

In FIGS. 4 and 5, the undercut longitudinal groove 12 does not have a circular construction but has an approximately V-shaped profile.

Corresponding to FIG. 4, the holding element 15 is constructed in two parts and is formed by means of a plastic strip 20 connected with the retaining strip 14 and by a wedge-shaped elastic element 21.

The upright, approximately rectangular plastic strip 20 is fixedly connected (sewn, glued or the like) with the free end of the retaining strip 14 and has a slightly lower height than the longitudinal groove 12.

After the insertion of the retaining strip 14 connected with the plastic strip 20, the element 21, which is preferably made of rubber, is inserted into the longitudinal groove 12 and is held in position in it in a clamping manner. A nose-type projection 22 of the element 21 reaches in sections behind the undercut longitudinal groove 12. The element 21 is arranged on the side of the retaining strip 14 facing away from the plastic strip 20 and has an interior hollow area.

According to FIG. 5, the retaining strip 14 is connected on its free end with a resilient spreading member 23 which can lockingly be inserted in the longitudinal groove 12. A snap hook 24 of the spreading member 23 reaches in sections behind a nose 25 of the longitudinal groove 12. The spreading member 23 is sewn or glued to the free end of the retaining strip 14.

The first receiving device 9 is constructed on the top side of the tensioning bow 4, which is bent approximately in a U-shape in the top view, and is disposed in front of the adjoining folding top compartment lid 8.

On the forward edge of the folding top compartment lid 8, a molding 26 is placed which interacts with an interior sealing profile 27.

On the rearward edge area of the tensioning bow 4, the second receiving device 10 is provided which is open toward the top, the sealing body 7 inserted into the second receiving device 10 interacting with the folding top compartment lid 8 disposed above it. The second receiving device 10 has an approximately U-shaped profile (FIG. 3).

A first, slightly longer leg 28 of the second receiving device 10 is bent on its free, upper end in the direction of the second leg 29. On its free, upwardly directed end, the second leg 29 has an inwardly directed, nose-shaped molded-on section 30. The first sealing body 7 comprises a foot section 31 inserted into the second receiving device 10 and two hollow profile sections 32, 33 disposed above one another, in which case the upper hollow profile section 33 is supported on the interior side of the folding top compartment lid 8 or on the fitted-on molding 26.

On the side facing the folding top compartment lid 8, the first sealing body 7 is coated in sections with a sliding lacquer (not shown in detail).

Furthermore, on the top side of the tensioning bow 4 between the first and the second receiving device 9, 10, another undercut receiving device 34 is constructed which receives a corresponding foot section 35 of a second sealing body 36 (FIG. 3).

The second sealing body 36 compensates gaps of different sizes between the edge of the folding top covering 2 and the first sealing body 7 in the transversely extending central area and the two laterally exterior areas of the tensioning bow 4.

According to FIG. 3, a hollow profile section 37 with a parallelogram-type cross-section is connected to the foot section 35. Lip sections 39, 40 lead away on both sides from the upper web 38 of the hollow profile section 37, which lip sections 39, 40 are supported with their free ends on the edge area of the folding top covering 2 and the folding top compartment lid 8 or the first sealing body 7 under prestress.

According to FIG. 4, the end 41 of the folding top covering 2 facing the tensioning bow 4 is either covered by the lip section 39 or the end 41' overlaps at least in sections the top side of the sealing body 36.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Folding top for vehicles having a folding top structure and a folding top covering, an edge area of the folding top covering being fastened on a rear-side tensioning bow of the folding top structure, and a sealing body being mounted on the tensioning bow and being in an operative connection with an adjoining vehicle body part, wherein separate receiving devices for fastening the edge area of the folding top covering and for holding the sealing body are provided on the tensioning bow, and wherein the edge area of the folding top covering is removable from the rear-side tensioning bow without removing the sealing body.

2. Folding top according to claim 1, wherein a first receiving device for the folding top covering is formed by an undercut longitudinal groove provided with a narrow insertion opening, an edge-side holding section of the folding top covering being inserted into the longitudinal groove.

3. Folding top according to claim 2, wherein the holding section is formed by a retaining strip fastened on the interior side of the folding top covering, the retaining strip having in the area of the longitudinal groove at least one holding element interacting therewith.

4. Folding top according to claim 3, wherein the retaining strip is sewn on its free end to a plastic strip, and wherein a wedge-shaped element is arranged on the side opposite the plastic strip, by means of which wedge-shaped element the edge-side holding section is held in position in a clamping manner in the longitudinal groove.

5. Folding top according to claim 1, wherein a first receiving device for the folding top covering is arranged on the top side of the tensioning bow which is bent in a U-shape in a horizontal plane through the vehicle, and is specifically disposed in front of an adjacent folding top compartment lid.

6. Folding top according to claim 2, wherein the first receiving device for the folding top covering is arranged on the top side of the tensioning bow which is bent in a U-shape in a horizontal plane through the vehicle, and is specifically disposed in front of an adjacent folding top compartment lid.

7. Folding top according to claim 3, wherein the first receiving device for the folding top covering is arranged on the top side of the tensioning bow which is bent in a U-shape in a horizontal plane through the vehicle, and is specifically disposed in front of an adjacent folding top compartment lid.

8. Folding top according to claim 1, wherein a first of the receiving devices is for the folding top and a second of the receiving devices is for the sealing body, and wherein the second receiving device is provided on the rearward edge area of the tensioning bow and is constructed to be open in the upward direction, the sealing body interacting with a folding top compartment lid disposed above it in an inserted position.

9. Folding top according to claim 8, wherein the second receiving device has an approximately U-shaped profiled with a leg which is bent on its free end in the direction of the other leg and in that the other leg has on its free upwardly directed end an inwardly directed nose-shaped molded-on section.

10. Folding top according to claim 8, wherein the sealing body is coated with a sliding lacquer on the side facing the folding top compartment lid.

11. Folding top according to claim 1, wherein, on the top side of the tensioning bow, between the separate receiving devices another undercut receiving device is arranged which receives a correspondingly constructed foot section of a second sealing body, and wherein a hollow profile section extends in the gap area between the edge area of the folding top covering and the first sealing body, from which hollow profile section lip sections lead away on both sides, the lip sections interacting in a supporting manner with the edge area of the folding top covering and a folding top compartment lid or the first sealing body.

12. Folding top according to claim 8, wherein the first receiving device for the folding top covering is formed by an undercut longitudinal groove provided with a narrow insertion opening, an edge-side holding section of the folding top covering being inserted into the longitudinal groove.

13. Folding top according to claim 12, wherein the holding section is formed by a retaining strip fastened on the interior side of the folding top covering, the retaining strip having in the area of the longitudinal groove at least one holding element interacting therewith.

14. Folding top according to claim 12, wherein the second receiving device has an approximately U-shaped profiled with a leg which is bent on its free end in the direction of the other leg and in that the other leg has on its free upwardly directed end an inwardly directed nose-shaped molded-on section.

15. Folding top according to claim 1, wherein the tensioning bow includes extruded profile light metal alloy sections with said receiving devices formed therein.

16. Folding top according to claim 3, wherein the retaining strip has on its free end an eye-type area with an inserted insertion part.

17. Folding top according to claim 3, wherein the holding section is formed by a weatherstrip sewn on the interior side to the folding top covering, which weatherstrip has a cross-sectional widening in the area of the longitudinal groove.

18. Folding top according to claim 3, wherein the retaining strip is connected on its free end with a resilient spreading member which can be inserted in a locking manner in the longitudinal groove.

19. Folding top according to claim 13, wherein the retaining strip has on its free end an eye-type area with an inserted insertion part.

20. Folding top for vehicles having a folding top structure and a folding top covering, an edge area of the folding top covering being fastened on a rear-side tensioning bow of the folding top structure, and a sealing body being mounted on the tensioning bow and being in an operative connection with an adjoining vehicle body part, wherein separate receiving devices for fastening the edge area of the folding top covering and for holding the sealing body are provided on the tensioning bow, each receiving device having a separate opening to an exterior of the tensioning bow.

* * * * *